UNITED STATES PATENT OFFICE.

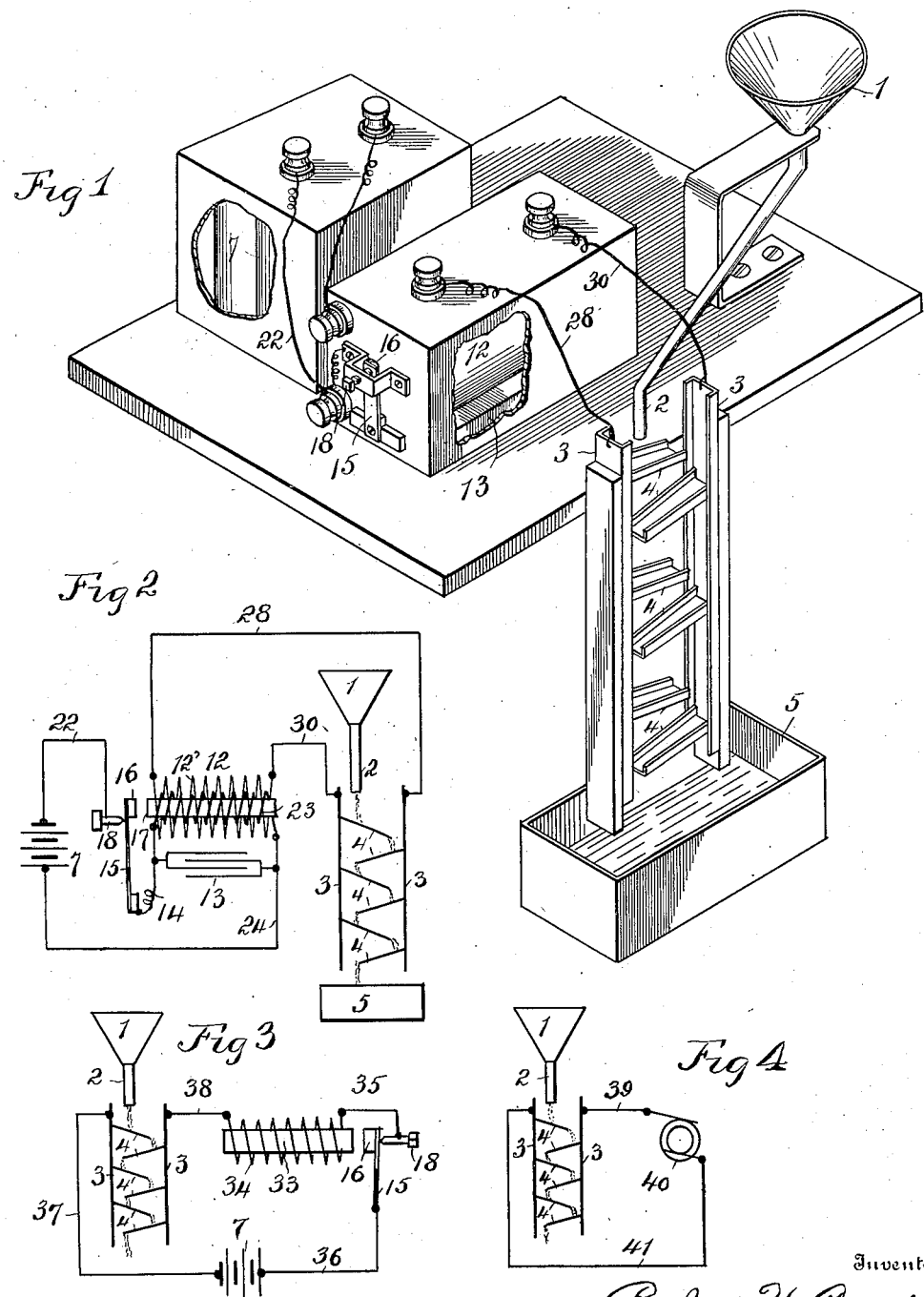

ROBERT W. PADDEN, OF KANSAS CITY, MISSOURI, ASSIGNOR TO ISADORE EBERT, OF EFFINGHAM, KANSAS.

PROCESS FOR SEPARATING CREAM FROM MILK.

No. 907,637.　　　Specification of Letters Patent.　　　Patented Dec. 22, 1908.

Application filed August 12, 1905. Serial No. 273,949.

*To all whom it may concern:*

Be it known that I, ROBERT W. PADDEN, a citizen of the United States, residing at Kansas City, in the county of Jackson and State of Missouri, have invented certain new and useful Improvements in Processes for Separating Cream from Milk, of which the following is a specification.

My invention relates to improvements in processes for electrically separating cream from milk.

The object of my invention is to provide a process by which an electrical current may be utilized for quickly separating cream from milk.

My invention provides a process consisting in passing an electric current through the milk to be treated, the passage of the current causing the separation of the cream from the milk.

My invention provides further the process consisting in passing a current of electricity through a stream of flowing milk, the movement of the particles of milk during the passage of the electrical current therethrough facilitating the separation of the cream therefrom.

My invention provides further a process in which the current of electricity in the form of a series of impulses is discharged through the milk.

The invention provides further the utilizing of an alternating current for treating the milk, such a current effecting a quicker separation of the cream than is obtained by the use of currents passing in one direction through the milk.

In the accompanying drawings illustrative of my invention, Figure 1. is a perspective view of an apparatus for carrying my process into effect. Fig. 2 is a diagrammatic view of the form of my invention shown in Fig. 1. Fig. 3 is a diagrammatic view of a modified form of apparatus for carrying my invention into effect in which an automatically broken direct current is employed. Fig. 4 is a diagrammatic view showing an apparatus in which an alternating generator is connected in series with the electrodes which receive the milk thereon.

Similar characters of reference denote similar parts.

Referring to Figs. 1 and 2,—1 denotes a vessel for containing the milk treated, provided with an outlet 2, comprising preferably a downwardly inclined tube, the upper end of which is connected with the vessel 1 and the lower end of which is disposed so as to discharge upon one of two electrodes comprising each a vertical electrical conducting member 3, each having a plurality of lateral arms 4 of conducting material, preferably trough-shaped devices, the devices on one member being disposed one above the other and disposed also alternately between the devices or arms 4 of the opposite member. The milk passing from the vessel 1 through the outlet 2 will fall upon the upper arm 4 of one member 3 and will fall from said arm upon the upper arm 4 of the opposite member 3, and so on, passing alternately from one arm of one electrode to the next lower arm of the opposite electrode, and finally falling into a receptacle 5 disposed below the members 3 and arms 4. If, during the passage of the milk downwardly by gravity from one arm 4 to the other, an electric current is passed through the milk from one set of arms to the other, a rapid separation of the cream from the milk will be obtained, the rapidity of such separation depending upon the character of the electric current employed. I have found that the best effects are produced with the use of an alternating current of high potential such a current being more effective for separating the cream than is obtained by the use of an automatically broken current flowing in one direction. A uni-direction current may be employed however, with considerable success, and in Fig. 3 I have illustrated an apparatus employing such a current. For producing the alternating currents I prefer to employ an induction coil in connection with a condenser and a battery.

Figs. 1 and 2 illustrate an apparatus employing an induction coil 12, the primary winding of which is connected by conductors 14 and 24 with the armature spring 15 and battery 7. A conductor 22 connects the battery 7 and contact screw 18. The opposite poles of a condenser 13 are connected with the conductors 14 and 24. The secondary winding 12' is connected by conductors 28 and 30 with the electrodes 3.

In carrying out this form of my invention the milk is poured into the vessel 1 and passes therefrom by the outlet 2 upon the arms 4, falling consecutively from one to the other, and from said arms into the receptacle 5. At this time the battery 7 connected to the primary winding 23 of the induction coil causes a current to pass through said winding, thus magnetizing the core 17 which attracts the armature 16, thus drawing the spring 15 away from the contact screw 18 and breaking the primary circuit. As soon as the said circuit is broken, the core 17 being de-magnetized permits the spring 15 to be moved by its normal tension against the screw 18, thus again closing the primary circuit. The primary circuit being thus automatically rapidly opened and closed will, in the well known manner, cause alternating currents to be generated in the secondary circuit of which the winding 12' is a part. The alternating currents passing through the milk falling upon the arms 4 and forming part of the secondary circuit, will cause a separation of the particles of cream from the milk, and the cream being lighter than the milk, will collect upon the surface of the milk in the receptacle 5, from which it may be readily removed by skimming. The operation of separating the cream from the milk may be made continuous by keeping a supply of milk constantly in the vessel 1.

Fig. 3 illustrates a means of interrupting a direct current by an electromagnet 33, for the purpose of effecting separation of the cream from milk. In this form of my invention the current passes from the battery 7 through conductor 37 to member 3, thence by the arms 4 of said member to the opposite arms 4 through the milk, thence by means of the adjacent member 3, conductor 38, helix 34, conductor 35, screw 18, spring 15 and conductor 36, back to the battery 7.

Fig. 4 illustrates an apparatus in which an alternating current generator 40 is connected by conductors 39 and 41 with the electrodes 3, the alternating currents passing from electrodes 3 and shelves 4 through the milk.

Various other modifications of my invention may be made without departing from its spirit.

Having thus described my invention, what I claim and desire to secure by Letters Patent, is:—

1. The process of separating cream from milk consisting in passing a series of electrical impulses through the milk.

2. The process of separating cream from milk consisting in passing an alternating electric current through the milk.

3. The process of separating cream from milk consisting in passing a series of electric impulses through a flowing stream of milk.

4. The process of separating cream from milk consisting in passing an alternating current through a flowing stream of milk.

5. The process of separating cream from milk consisting in causing milk to flow from one to another of two electrodes located in an electric circuit and simultaneously passing an alternating current between said electrodes.

6. The process of separating cream from milk consisting in causing milk to flow from one to another of two electrodes located in an electric circuit and simultaneously generating in said circuit a series of electrical impulses.

In testimony whereof I affix my signature in presence of two witnesses.

ROBERT W. PADDEN.

Witnesses:
WARREN D. HOUSE,
HENRY F. ROSE.